United States Patent Office 2,715,879
Patented Aug. 23, 1955

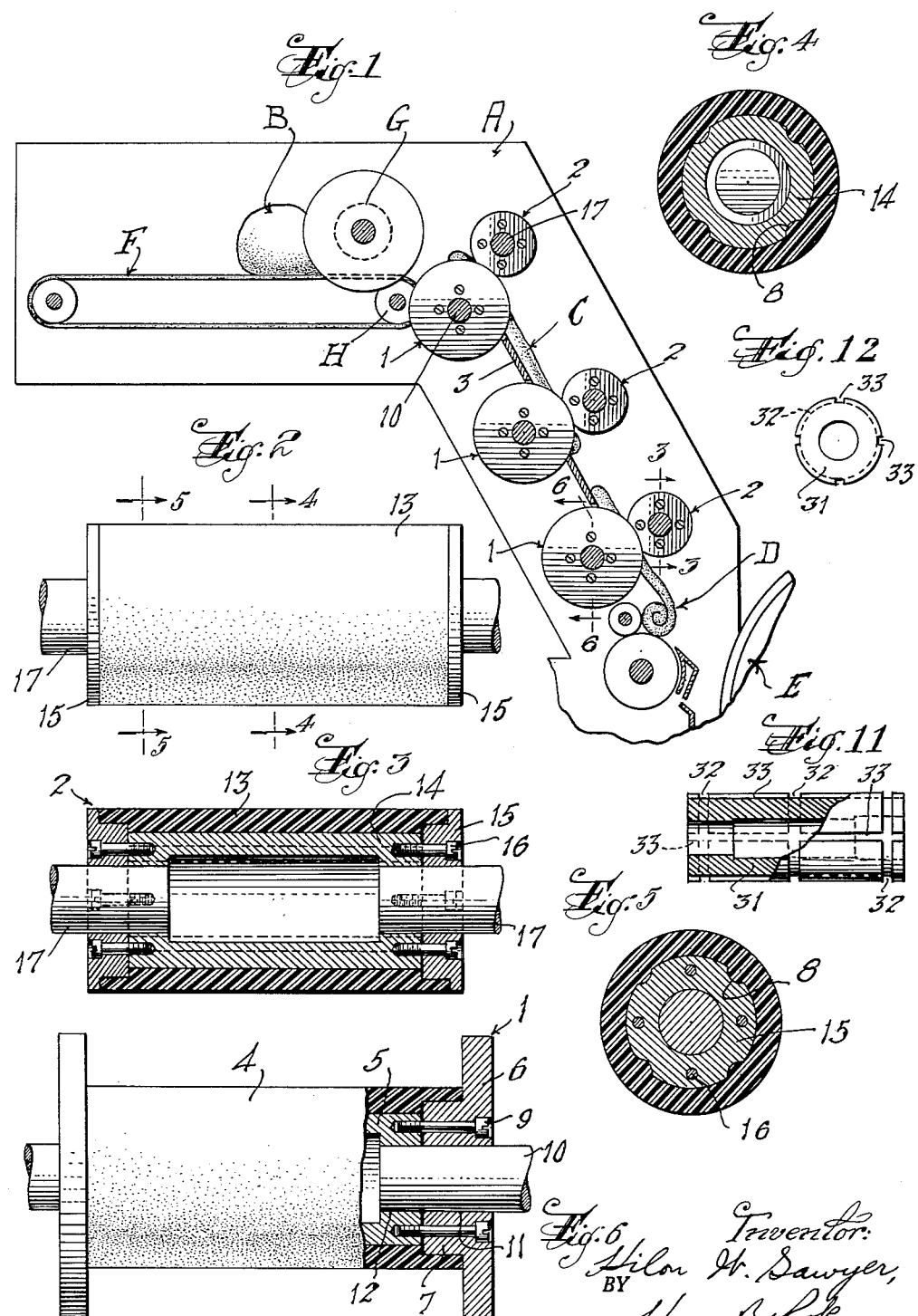

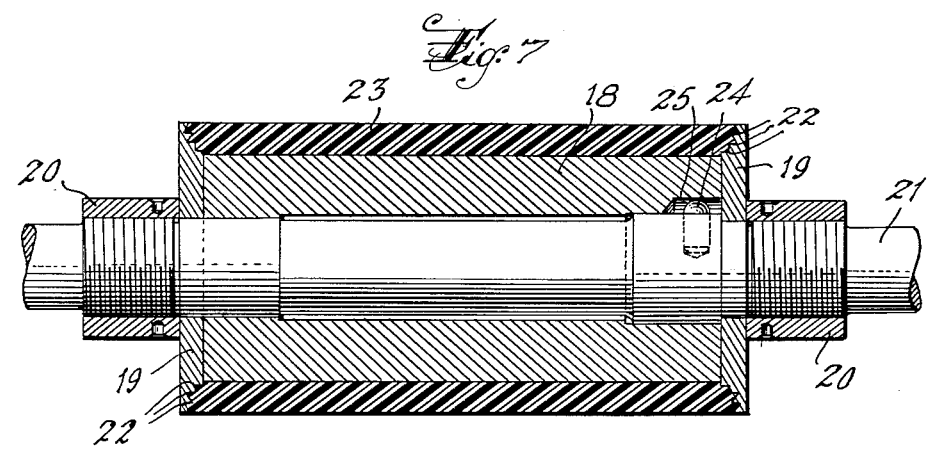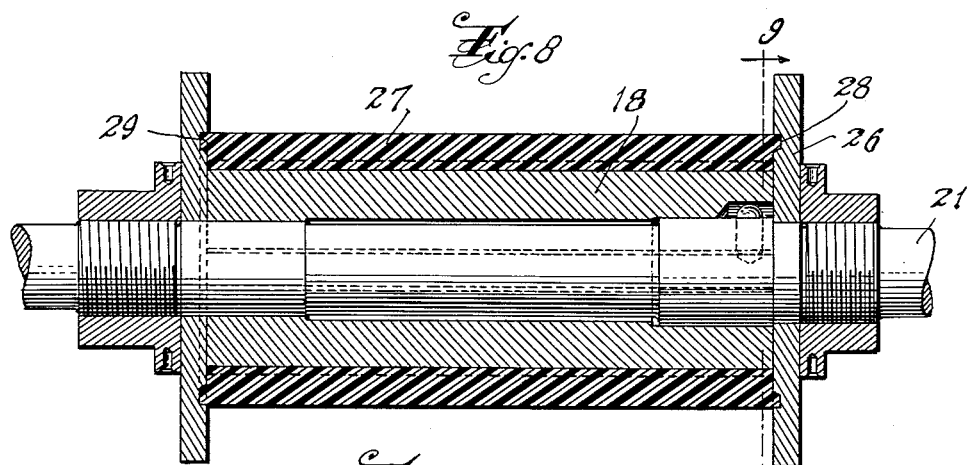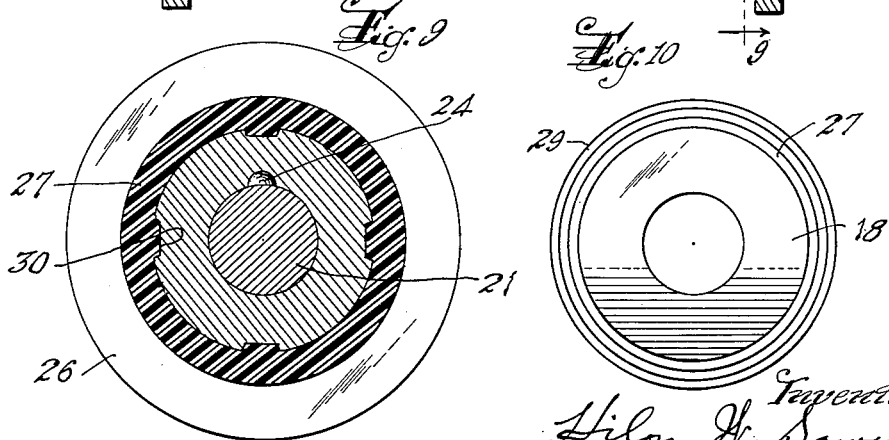

2,715,879

TRIFLUOROCHLOROETHYLENE SURFACED SHEETING ROLLER

Hilon W. Sawyer, Nutley, N. J., assignor to Wallace & Tiernan Incorporated, a corporation of Delaware Application May 23, 1950, Serial No. 163,598

1 Claim. (Cl. 107—12)

This invention relates in general to machines or devices for handling, sheeting or molding dough or similar stick or tacky masses, and more particularly the invention contemplates novel and improved rolls for sheeting dough in dough molding machines.

It is well known to those skilled in the art of dough molding that with the known sheeting apparatus it is not possible to obtain sheets as thin as is sometimes desired, and, moreover, it is necessary to continuously apply flour dust to the surfaces of the sheeting rolls or other machine parts with which the dough comes in contact, in order to prevent the dough from sticking to said surfaces. Furthermore, it has been customary to utilize metal scrapers for positively insuring the removal of any dough that might adhere to the surface over which the dough is moved.

A prime object of the present invention is to provide a machine of this general character which shall have novel and improved dough-contacting surfaces so that thinner sheets of dough can be obtained than has been heretofore possible, and the necessity for dusting of flour and for metal scrapers shall be obviated.

Another object of the invention is to provide a machine part for handling dough and the like which shall have a novel and improved permanent coating to provide a dough-contacting surface to which the dough shall not stick and over which the dough may easily travel.

Other objects are to provide novel and improved dough sheeting rolls which shall include a rigid, for example metal, core, a circumferential coating or covering of material to which the dough or the like will not stick, and end plates for interlocking said coating or covering with the core; and to obtain other results and advantages that will be brought out by the following description in conjunction with the accompanying drawings in which Figure 1 is a schematic vertical sectional view through a dough sheeting mechanism including sheeting rolls embodying the invention and illustrating said rolls in end elevation;

Figure 2 is an enlarged side elevational view of one of the sheeting rolls;

Figure 3 is an enlarged central vertical longitudinal sectional view taken on the plane of the line 3—3 of Figure 1;

Figures 4 and 5 are transverse vertical sectional views on the planes of the lines 4—4 and 5—5 of Figure 2, respectively;

Figure 6 is a side elevational view of another type of sheeting roll with portions broken away and shown in section approximately on the plane of the line 6—6 of Figure 1;

Figure 7 is a view similar to Figure 3 showing a modification of the invention embodied in a flangeless roll;

Figure 8 is a similar view showing a modification of the invention embodied in a flanged roll;

Figure 9 is a transverse vertical sectional view approximately on the plane of the line 9—9 of Figure 8;

Figure 10 is an end elevational view of the core and covering of the roll removed from the shaft and with the end flange detached;

Figure 11 is a composite side elevational and vertical longitudinal sectional view on a reduced scale through a modified core for the roll; and Figure 12 is an end elevational view thereof similar to Figure 10.

For the purpose of illustrating the principles of the invention, I have shown it in conjunction with a generally known type of dough sheeting machine which is associated with a dough molder of known type, but it should be understood that the invention may be embodied in other types of apparatus within the spirit and scope of the invention.

As shown, the dough sheeting apparatus includes a frame comprising two spaced side pieces A, one of which has been removed in Figure 1.

Between the side pieces A of the frame are a plurality of dough sheeting rolls arranged in pairs, each pair comprising a flanged roll 1 and an unflanged roll 2 which are adapted to receive a lump of dough B between them for forming the dough into a sheet C which is then curled as indicated at D into a spiral roll that is deposited into a dough molding machine the drum of which is designated E. The lump of dough B is fed by a conveyor belt F to a dough flattening roll G which cooperates with one roll H of the conveyor for preliminarily flattening the lump before it is fed to the upper pair of sheeting rolls. The sheet of dough C is guided from one pair of sheeting rolls to the next by guide plates 3. All of the above described structure is in general old, for example as shown in Patent No. 2,063,750 granted on December 8, 1936 to Edward T. Parsons, assignor to Thomson Machine Company, and is shown primarily as an example of one possible use of the present invention.

In accordance with the invention, both of the sheeting rolls 1 and 2 of each pair include a core or body portion which has a coating or cover 4 of a polymer of trifluorochloroethylene which is sold under the trade name "Kel-F" by the M. W. Kellogg Co., Jersey City 3, New Jersey. This substance is an exceptionally stable, high temperature, easily moldable thermoplastic which has high resistance to chemical action and to wetting; and about four-fifths (⅘) of its weight comprises two halogens, fluorine and chlorine.

The covering or coating may be applied to the roll in any suitable manner, but specifically describing the roll 1, it has a cylindrical metal core 5 to opposite ends of which are secured end flanges 6 that have hub portions 7 of a diameter slightly greater than the diameter of the core, and the covering 4 is molded onto the core and flanges. Preferably the core and the flanges have their surfaces grooved or otherwise roughened as indicated at 8 to form a bond with the covering. For convenience, the flanges 6 may be separately secured to the core by screws 9. When it is desired to mount the roll in a machine, shaft portions 10 are secured in coaxial openings 11 and 12 in the flanges and core, respectively.

The flangeless roll 2 is similarly constructed, having a coating or covering 13 of the same material as the covering 4 and including a core 14 like the core 5 to which the plates 15 are secured by screws 16, said plates being of a diameter the same as the outer surface of the covering 13 and the overall length of the roll being such as to fit between the flanges of the corresponding roll 1. The roll 2 is mounted on a shaft or shaft sections 17 corresponding to the shaft sections 10 of the roll 1.

Another form of flangeless roll is shown in Figure 7 where the reference character 18 designates a cylindrical core at the ends of which are secured end plates 19 by nuts 20 screwed on the shaft 21, the inner surfaces of the end plates that project beyond the outer periphery of the core having a plurality of undercut grooves 22 in which portions of the covering layer are seated to form a bond between the covering 23 and the end plates 24, said grooves including surfaces disposed in overhanging relation to an imaginary extension of said periphery of the core. The core is keyed to the shaft by a key 24 in the shaft seated in a keyway 25 in the core.

The flanged roll may be of generally similar construction as shown in Figure 8, except that the end plates 26 extend beyond the covering 27 and each is provided with a single annular groove 28 into which extends an annular rib 29 on the corresponding end of the covering 27. As shown, each groove 28 has its outer side wall or surface in overhanging relation to an imaginary extension of the periphery of the core 18.

The outer periphery of the cores 18 are grooved or roughened as indicated at 30 to prevent relative rotation of the covering and the cores.

Figures 11 and 12 show another form of core for the roll which is in general similar to that shown in Figures 7 and 8, the main difference being that the core 31 has a plurality of circumferential grooves 32 spaced longitudinally thereof and intersecting the circumferentially spaced longitudinal grooves 33, for the purpose of restraining longitudinal movement or stretching of the covering under pressure incident to dough sheeting operations. The covering may be identical with that shown in either Figures 7 and 8 and the plates like those shown in Figures 7 and 8 may be secured to the ends of the core.

In all forms of the invention described, it will be observed that the coverings or coatings are practically integral with the cores, being molded thereon, and the covering layers are restrained by the end plates 19 and 26 against longitudinal and circumferential expansion at the ends of the covering layers. The outer surface of the covering is substantially non-wettable, has only minute pores and has a high degree of smoothness, and it has been found that dough sheeting machines embodying rolls like those hereinbefore described, are capable of producing much thinner sheets of dough than has been heretofore possible and with no sticking of the dough to the coverings so that the necessity for dusting of flour on machine rolls or of utilizing scrapers for the sheeting rolls, has been completely eliminated.

While the thickness of the coverings 4, 13, 18 and 27 is not critical, it has been found that the covering may be of a thickness as little as one-quarter (¼) inch so that a minimum of the coating substance is required and yet adequate resistance to the pressure of sheeting is obtained.

It should also be understood that covering layers of other plastic compositions or synthetic resins than a polymer of trifluorochloroethylene, may be applied to rolls in the manner hereinbefore described.

I claim:

A roll for working sticky or tacky substances combining a rigid cylindrical core having a roughened peripheral surface, a tubular covering layer comprising a polymer of trifluorochloroethylene molded on and bonded with said roughened peripheral surface and thereby secured against rotation relatively to said core, and an end plate rigidly secured at each end of said core and having undercut portions with surfaces in overhanging relation to an imaginary extension of the periphery of said core, the end surfaces of said covering layer having portions corresponding in shape to said undercut portions and seated in said undercut portions, thereby interlocking the end portions of said covering layer with the end plates to prevent longitudinal and circumferential expansion of the covering layer at its ends.

References Cited in the file of this patent

UNITED STATES PATENTS

| | | |
|---|---|---|
| 29,006 | Rice et al. | July 3, 1860 |
| 216,553 | Braun | June 17, 1879 |
| 367,737 | Arthur | Aug. 2, 1887 |
| 705,654 | Djup | July 29, 1902 |
| 732,728 | Forsyth | July 7, 1903 |
| 1,179,294 | Embrey | Apr. 11, 1916 |
| 1,370,709 | Smith | Mar. 8, 1921 |
| 1,430,265 | Sexaver | Sept. 26, 1922 |
| 1,693,358 | Vedder | Nov. 27, 1928 |
| 2,403,476 | Berry et al. | July 9, 1946 |
| 2,586,089 | Rhodes | Feb. 19, 1952 |

FOREIGN PATENTS

| | | |
|---|---|---|
| 465,520 | Great Britain | May 3, 1937 |

OTHER REFERENCES

Plastics Bulletin, volume 12, #46, 1950, published by Du Pont—Wilmington, Del.

Kel-F #1-1-49 (P. I), The M. W. Kellogg Co., P. O. Box 469, Jersey City 3, New Jersey.

Publication: Bakers Weekly, vol. 148, No. 5, page 2 of October 30, 1950.

Fluorine Plastics, pages 164–166 of the Rubber Age and Synthetics, June 1953.